United States Patent [19]

Bradford

[11] Patent Number: 4,770,551

[45] Date of Patent: Sep. 13, 1988

[54] PRINTING APPARATUS FOR ENCIPHERING/DECIPHERING TEXT

[75] Inventor: Robert G. Bradford, Falkirk, Scotland

[73] Assignee: Unisys Corporation, Blue Bell, Pa.

[21] Appl. No.: 917,782

[22] Filed: Oct. 10, 1986

[30] Foreign Application Priority Data

Nov. 30, 1985 [GB] United Kingdom ................ 8529523

[51] Int. Cl.[4] .......................... B41J 1/30; G09C 3/00

[52] U.S. Cl. ...................................... 400/90; 400/104; 400/144.2; 380/55

[58] Field of Search ................... 400/89, 90, 103, 104, 400/144.2, 144.3, 320, 313, 317, 322, 323, 328; 74/89.17, 89.21, 89.22, 422, 424.5, 424.6; 380/55, 56, 57, 58; 474/153, 167, 168, 169, 170, 171; 360/101, 105, 106, 109

[56] References Cited

U.S. PATENT DOCUMENTS

| | | | |
|---|---|---|---|
| 644,165 | 2/1900 | Freret, Jr. | 400/89 |
| 2,571,427 | 10/1951 | Drachman | 74/89.21 |
| 3,273,408 | 9/1966 | Nagel et al. | 74/89.22 |
| 3,356,199 | 12/1967 | Robinson | 400/144.3 |
| 3,371,766 | 3/1968 | Staller | 400/144.3 |
| 3,858,509 | 1/1975 | Grundherr | 400/144.2 |
| 3,884,339 | 5/1975 | Castoldi et al. | 400/144.3 |
| 3,926,061 | 12/1975 | Paulson | 400/144.2 |
| 4,664,543 | 5/1987 | Bohg et al. | 400/174 |

FOREIGN PATENT DOCUMENTS

| | | | |
|---|---|---|---|
| 41204 | 3/1980 | Japan | 400/322 |
| 107379 | 6/1983 | Japan | 400/144.3 |

*Primary Examiner*—David A. Wiecking
*Attorney, Agent, or Firm*—Mark T. Starr

[57] ABSTRACT

A printer employing a daisy wheel or other print wheel uses a single motor both to translate a carriage along a line of printing and to rotate the daisy wheel. The daisy wheel is rotated through one complete character set for movement of the carriage along the print line by one character printing space. Type on the fingers of the daisy wheel is progressively displaced relative to a center line through the ordered set to be printed early on the line of printing by a distance which is a proportional part of one print line letter space, the displacement proportional to the position of a character in the set between a first character and a last character.

Also disclosed is a controller for the printer, the controller including enciphering capabilities whereby enciphered text is produced.

23 Claims, 11 Drawing Sheets

PRINTING APPARATUS FOR ENCIPHERING/DECIPHERING TEXT

BACKGROUND OF THE INVENTION

The present invention relates to a printing apparatus of the type wherein a print wheel is presented to a hammer mechanism for printing of a character upon paper or other sheet material.

It is known to use a print wheel to print characters upon paper or other sheet material. The print wheel can take the form of a daisy wheel wherein a plurality of type-bearing fingers are held in and elastically restored to the plane of a central supporting disc, or to take the form of a type wheel where the fingers are elastically supported at an angle, typically 90°, to the plane of the central supportive disc. The print wheel is rotated until a desired character falls beneath a hammer mechanism which is operated to cause the hammer, selected typeface character and ink ribbon to come together onto the paper to leave a printed record.

In the prior art, a printhead assembly was first positioned where the character is to be typed or printed and the daisy wheel either thereafter or simultaneously with the printhead positioning is rotated until the desired character is under the hammer. The hammer is then operated to cause the above described printing operation. Separate motors are required to position the print wheel and to position the printhead assembly. At least one of the motors is required to be situated on the printhead assembly, severely limiting the degree of miniaturization possible in such a printer. The daisy wheel or other print wheel is required to accelerate and decelerate in two directions, thus inducing bi-directional stress in the daisy wheel or print wheel rotating apparatus.

The present invention seeks to provide improvement over the prior art by providing a print wheel printer wherein only a single motor is required both for the positioning of the printhead assembly and for the rotary positioning of the print wheel. The present invention seeks further to provide improvement over the prior art by allowing for the single motor to be positioned away from the printhead assembly, thereby allowing for miniaturization of the printer to permit the use of a print wheel or daisy wheel printer in those situations where previously only a low quality dot-matrix printer could be used.

In the prior art, controllers were provided for a print wheel printer wherein the print wheel was rotated bi-directionally towards a desired printed character being beneath the printing hammer. The present invention seeks to provide improvement over the prior art by allowing the use of a controller where the print wheel is rotated uni-directionally between successive printing operations, thereby allowing by a simple process the enciphering and deciphering of documents such that they may readily be prepared and read but cannot be rapidly deciphered without knowledge of a simple deciphering key and without use of such a uni-directional controller.

SUMMARY OF THE INVENTION

The present invention resides in a printing apparatus having a printhead assembly wherein a print wheel is rotatable to present a selected character to a hammer and wherein the print-head assembly is movable relative to a line on which characters are to be printed at a plurality of spaced printing locations, the apparatus including means operative to rotate the print wheel to present in turn each of a completed ordered set of characters for printing to said hammer in sympathy with movement of the printhead assembly along the line by a distance equal to the spacing between successive printing locations, where the complete set includes a first character, undisplaced on the print wheel and where each other character in the complete set is displaced on the print wheel to be printed early on the line, a portion of said space between successive printing locations proportional to the fraction of the ordered set between the each other character and the first character.

In a first preferred embodiment, a differential wheel having first and second portions at first and second diameters and mounted upon a printhead carriage assembly, has a daisy wheel co-axially mounted thereon and is rotated by an endless belt looped around the first and second portions and driven either directly by a motor on the printhead carriage assembly or by a motor at an extreme end driving a driven pulley transferring its rotation to the endless band or belt. The differential wheel moves the carriage along a fixed path at the same time as the daisy wheel rotates. When any desired character falls beneath a hammer assembly, it is typed in the usual manner. The typed characters or typeface on the daisy wheel is displaced such that although the printhead carriage assembly does not move an exact character space, necessarily, between typing operations, the typed characters are always properly spaced.

In the second preferred embodiment, the endless belt wrapped around the differential wheel is replaced by an endless timing belt with teeth engaging first and second portions of first and second diameters of a toothed gear wheel.

In both the first and second preferred embodiments, the hammer may be placed at any angle around the daisy wheel. When the hammer is spaced from the axis of rotation of the daisy wheel along the line of printing, the typeface characters are radially displaced along the individual fingers of the daisy wheel. When the hammer is displaced along an axis at 90° to the line of printing, the typeface characters are tangentially displaced on the individual fingers of the daisy wheel. When the hammer assembly is in a combination of these positions, the typeface characters are displaced by a mixture of tangential and horizontal displacements on the individual fingers of the daisy wheel.

In a third preferred embodiment of the invention, the endless belts of the first and second preferred embodiments are replaced by rigid racks having a transfer roller therebetween.

In a fourth preferred embodiment of the invention, the print wheel carriage assembly is moved along the line of printing in any of a number of manners known in the art and a roller rolls along a flat platform disposed along the line of printing for its rolling motion to be coupled to the daisy wheel or print wheel.

A controller, suitable for use with all the preferred embodiments of the present application, calculates the number of print wheel positions required to be moved between printing of adjacent characters and ensures that that number of print wheel positions or steps is executed before operation of the hammer mechanism. Because the print wheel always rotates uni-directionally in each sweep along the line of print, the controller allows for simple enciphering either by printing that character a predetermined number of steps further around from the desired character or by providing an incremental off-set such that the printed character is away from the desired printed character by a number of daisy wheel steps which increases by a predetermined number on each occasion of printing. When deciphering such enciphered print, it is merely necessary to apply a simple addition process or subtraction process using the known off-sets in the reverse to either of the above described manners in order to achieve rapid deciphering.

BRIEF DESCRIPTION OF THE DRAWINGS

The present invention is further described, by way of an example, by the following description taken in conjunction with the appended drawings, in which.

DETAILED DESCRIPTION OF THE INVENTION

Figure 1:
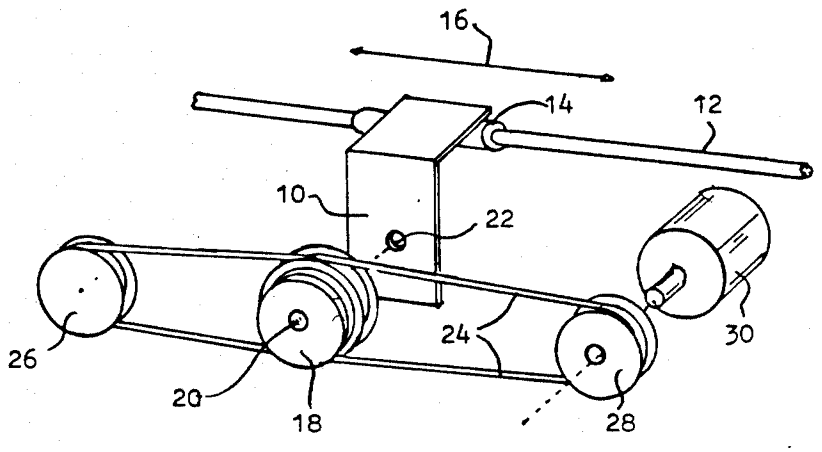
FIG. 1 shows a projected view of the carriage transport portion of the first preferred embodiment of the present invention.

FIG. 1 shows the carriage transport portion of a first preferred embodiment of the present invention. A printhead carriage 10 is mounted to slide in both directions on a guide rod 12 by means of a bush or sliding bearing 14 as illustrated by the first arrow 16. A differential wheel 18 is mounted on an axle 20 through a mounting hole or opening 22 in the printhead carriage 10 to rotate on the printhead carriage 10 and to transfer any translational forces it may experience to the printhead carriage 10.

An endless belt or band 24 passes around the differential wheel 18 in a manner to be described later and is supported at its extreme ends by an idler pulley 26 and a driven pulley 28 urged to rotate by a motor 30. The printhead carriage assembly 10, in moving along the guide rod 12, moves along a line of printing adjacent to paper, typeribbon and a platen in a manner well known in the art and not described in the present application. It should be understood that in this and all the other preferred embodiments of the present invention, that such elements exist in the printing apparatus.

Figure 2:
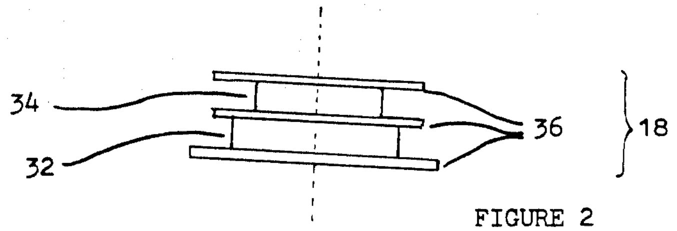
FIG. 2 shows a cross-sectional view of the differential wheel assembly of FIG. 1.

FIG. 2 shows a cross-sectional view of the differential wheel 18 of the first preferred embodiment shown in FIG. 1.

The differential wheel 18 is circular and comprises a first portion 32 of a first diameter and a second portion 34 of a second diameter. Walls 36 prevent the endless belt 24 from slipping from the first 32 and second 34 portions of the differential wheel 18.

Figure 3:
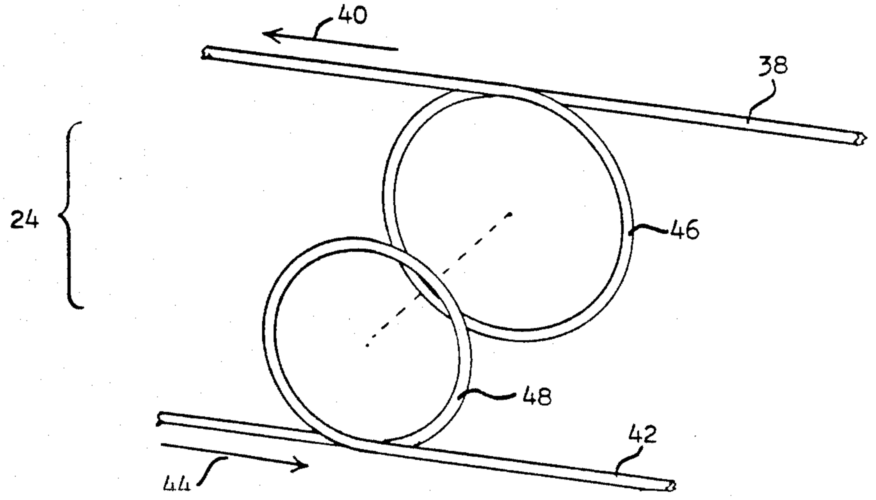
FIG. 3 shows how the endless belt of FIG. 1 is looped around the differential wheel.

FIG. 3 shows the manner in which the endless belt 24 of FIG. 1 is looped around the first 32 and second 34 portions of the differential wheel 18.

A first portion 38 of the endless belt or band 24 moves, by way of example, as illustrated by a second arrow 40 as the driven pulley 28 is rotated by the motor 30. A second portion 42 of the belt or band 24 moves, when the first portion moves as indicated by the second arrow 40, as indicated by a third arrow 44, it being understood that if the direction of rotation of the driven pulley 28 were to be reversed, then the direction of the second and third arrows 40,44 would also be reversed.

A first loop 46 in the first portion 38 of the belt or band 24 passes around the first portion 32 of the differential wheel 18. A second loop 48 in the second portion 42 of the endless belt or band 24 passes around the second portion 34 of the differential wheel 18. Both loops 46,48 are wound on their respective portions 32,34 of the differential wheel 18 such that as the driven pulley 28 is rotated by the motor 30, both loops 46,48 cause the differential wheel 18 to be urged to rotate in the same angular sense and direction.

Referring to FIGS. 1, 2 and 3, as the belt 24 is moved by the driven pulley 28 as indicated by the second and third arrows 40,44, the first loop 46 around the first portion 32 of the differential wheel 18 causes the differential wheel 18 to rotate and the first portion 32 of the differential wheel 18 moves along the first portion 38 of the belt or band 24 by a first distance. Correspondingly, the second loop 48 in the second portion 42 of the endless belt 24 causes, by engagement with the second portion 34 of the differential wheel 18, the differential wheel 18 to rotate in the same sense as the first loop 46 causes the differential wheel 18 to rotate. The second loop 48 thus tends to cause the differential wheel 18 to move along the second portion 42 of the endless belt or band 24 by a second distance. The differential motion of the first 38 and second 42 portions of band in opposite directions by equal amounts, as indicated by the second 40 and third 44 arrows, means that the axle 20 of the differential wheel 18 moves the printhead carriage 10 along the guide rod 12 by a distance equal to the difference that the differential wheel 18 rolls respectively along the first portion 32 of the differential wheel 18 and the second portion 34 of the differential wheel 18.

The distance moved along the guide rod 12 for each rotation of the driven pulley 28 can be controlled by selection of the ratio of the diameters of the first 32 and second 34 portions of the differential wheel 18. When the first 32 portion of the differential wheel 18 has the same diameter as the second portion 34 of the differential wheel 18, the printhead carriage 10 remains in the same place no matter how many revolutions the driven pulley 28 may make. As the ratio between the two diameters increases (or decreases from unity) so the distance moved by the printhead carriage 10 along the guide rod 12 per rotation of the driven pulley 28 increases. By selection of the diameter of the driven pulley 28 and of the diameters of the first 32 and second 34 portions of the differential wheel 18, the printhead carriage 10 may be caused to move along the guide rod 12 as much or as little distance as is desired per driven pulley 28 revolution.

Although in this embodiment the carriage 10 has been shown as being constrained to move along a line of printing by a guide rod 12, it is to be understood that any system of grooves, guides, recesses or wires can be used for the same purpose.

The motor 30 can be a stepping motor wherein a plurality of stable positions per revolution is provided, the position of the carriage 10 being determined by counting the number of steps. Equally, the motor 30 can be a directly driven motor driving either directly or indirectly some form of rotational position encoder whose output is indicative of the rotation of a shaft of the motor.

Figure 4:
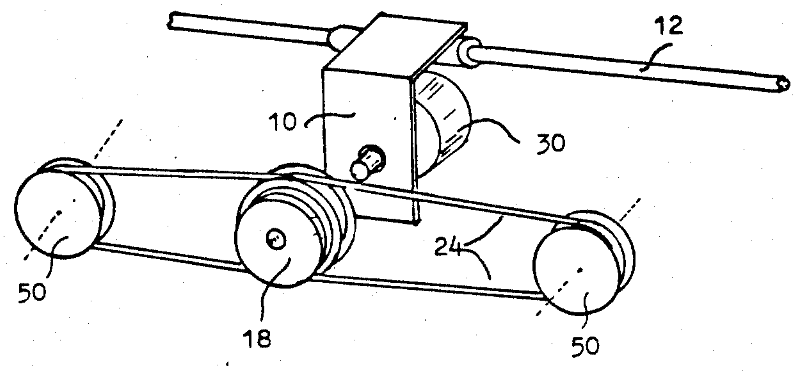
FIG. 4 shows a variation of the first preferred embodiment over that shown in FIG. 1.

FIG. 4 shows a modification of the preferred embodiment shown in FIG. 1, wherein the idler pulley 26 and the driven pulley 28 have been replaced by a pair of idling wheels 50 supporting the endless belt or band 24 at its extreme ends. The motor 30 is transferred from the body of the printing apparatus (where it is stationary as in FIG. 1) to the printhead carriage 10 itself where it drives the differential wheel 18 either directly or through a gear box mechanism.

The rotation imparted to the differential wheel 18 causes paying out of the endless belt or band 24 equally and oppositely in each direction along the line of printing, the difference in circumferential distance travelled in the first 32 and second 34 portions of the differential wheel 18 once again being taken up by movement of the carriage 10 along the guide rod 12.

Figure 5:
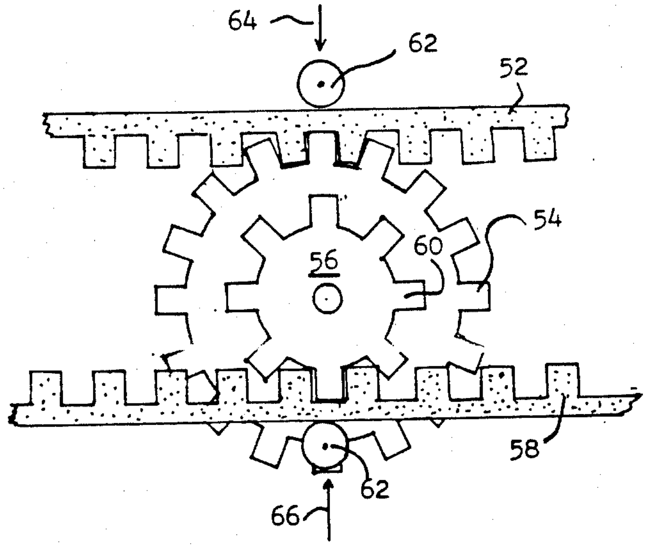
FIG. 5 shows a second preferred embodiment of the present invention.

FIG. 5 shows a second preferred transport mechanism constituting a second preferred embodiment. The endless band 24 is replaced by an endless toothed timing belt having a first portion 52 of the timing belt resting with its teeth engaged with a first portion 54 (having a first diameter) of a differential gear wheel 56. A second portion 58 of the endless timing belt engages its teeth with teeth in a second portion 60 (having a second diameter) of the differential gear wheel 56. Pressure rolls 62 urge the first 52 and second 58 portions of the timing belt onto the first 54 and second 60 portions of the differential gear wheel 56 as indicated by fourth 64 and fifth 66 arrows. The differential gear wheel 56 is fixed to the printhead carriage 10 in the same manner as the differential wheel 18 and similarly translates the carriage 10 along the guide rod 12.

With reference to FIGS. 1-4, it is to be appreciated that although the first 46 and second 48 loops are shown as comprising a single turn around the first 32 and second 34 portions of the differential wheel 18, they may comprise more than one turn.

Figure 6:
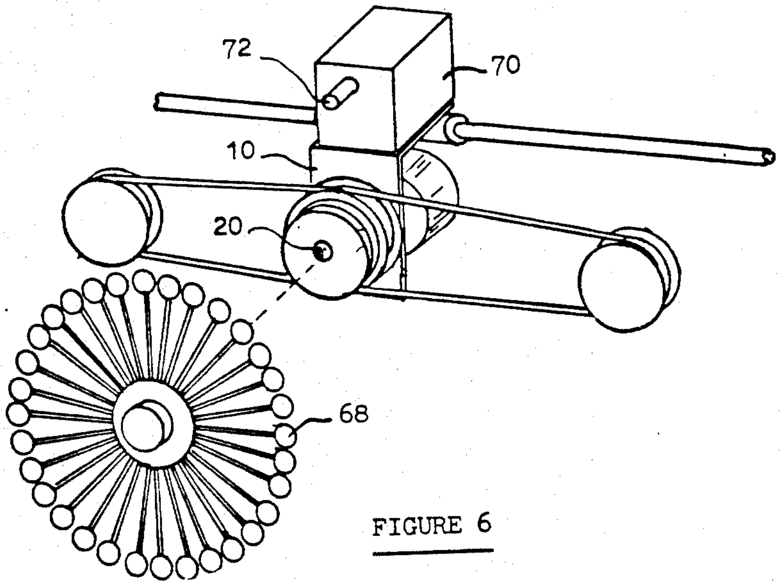
FIG. 6 shows how, in both the first and first preferred embodiments, the daisy wheel may be mounted upon the differential wheel or differential gear wheel with a hammer assembly spaced away from the axis of rotation of the daisy wheel along a line at 90° to the line printing.

FIG. 6 shows how a daisy wheel 68 is affixed to rotate with the differential wheel 18 or the differential gear wheel 56 of the first and second preferred embodiments. The daisy wheel 68 is centrally mounted coaxially on the axle 20 to rotate with the differential wheel 18, it being understood that whenever reference is made to the differential wheel 18 this also means the differential gear wheel 56 of the second embodiment. A hammer assembly 70 is shown in FIG. 6 in a first preferred position on the printhead carriage 10. The hammer assembly 70 includes a hammer 72 mounted spaced away from the axle 20 in a direction at 90° to the guide rod 12 and thereby 90° to the line on paper (not shown) whereon printing is to take place. The distance between the hammer 72 and the axle 20 is chosen for the hammer 72 to strike the rear of typeface bearing fingers on the daisy wheel 68 at their distal ends.

Figure 7:
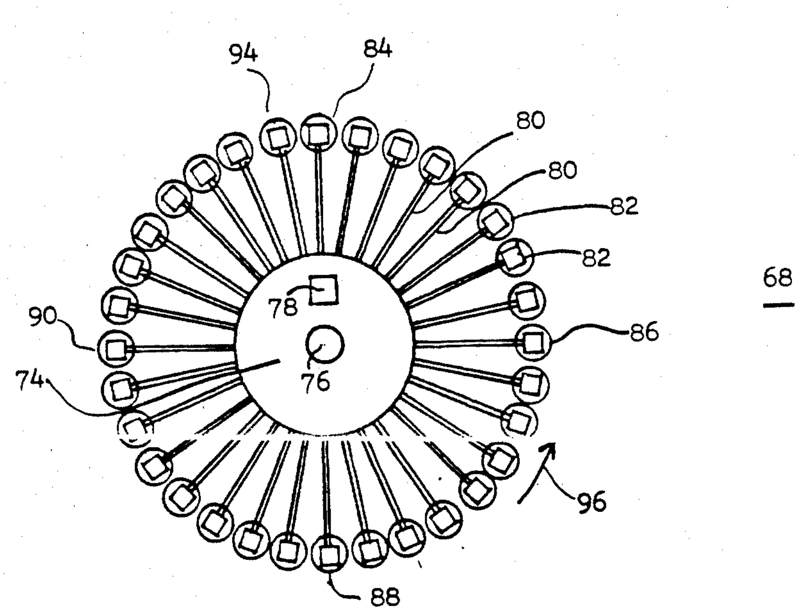
FIG. 7 shows a plan view of a typical daisy wheel.

FIG. 7 shows an exemplary daisy wheel 68 such as that of FIG. 6.

The daisy wheel 68 comprises a central hub 74 having central mounting means such as a recess or boss 76 operative to engage the daisy wheel 68 with the axle 20 or otherwise maintain the daisy wheel 68 centrally located upon the differential wheel 18, and a reference key 78 for ensuring that the daisy wheel 68 fits upon the differential wheel 18 (or 56) in a predetermined angular orientation.

The daisy wheel 68 further comprises a plurality of flexible fingers 80 at the distal end of each of which is provided a typeface portion 82 which is struck by the hammer 72 on its non-typeface side to cause printing. A predetermined typeface character is chosen as a first typeface character 84. A second typeface character 86 90° around the daisy wheel 68 from the first typeface character 84 is chosen as the second typeface character. A third typeface character 88 is selected 180° around the daisy wheel 68 from the first typeface character 84 and a fourth typeface character 90 is chosen 270° around the daisy wheel 68 from the first typeface character 84.

The first 84, second 86, third 88 and fourth 90 typeface characters represent successive stages in a sequence of characters around the daisy wheel 68 and are here chosen to exemplify the manner in which the typed character in each position is moved relative to its flexible finger 80 to accommodate the operation of the present invention.

Figure 8:
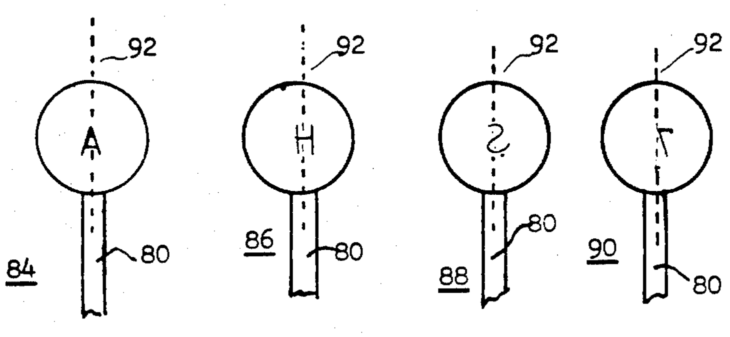
FIG. 8 shows the manner of tangential displacement of typed characters on the daisy wheel when the hammer position of FIG. 6 is employed.

FIG. 8 shows the manner in which the typeface characters are tangentially moved upon the daisy wheel 68 when the position of the hammer 72 shown in FIG. 6 is adopted.

As the carriage 10 moves along the guide rod 12 so each print character on its typeface portion 82 is presented to the hammer 72 in sequence and as each desired character on its typeface portion 82 passes beneath the hammer 72, so the hammer 72 is operated to type that selected character.

The diameter of the first portion 32 and of the second portion 34 or of the first geared portion 52 and the second geared portion 60 of the differential wheel 18 or the differential timing wheel 56 are chosen such that the daisy wheel 68 makes one complete revolution as the carriage assembly 10 moves along the guide rod 12 by the space allocated to one printed character along the line of print to be made (and not here shown).

FIG. 8 shows the typeface of the selected characters 84,86,88,90 of FIG. 7 seen from the raised or embossed side and thus having the characters in mirror image.

The first character 84 in the set has its type character (here exemplified by the letter A) symmetrical about a center line 92 of the flexible finger 80 on which it is mounted.

The second typeface character 86 has its printed character (here exemplified by the letter H) displaced by one quarter of a letter spacing from the center line 92 of its finger 80 such that when the hammer 72 strikes the typeface portion 82 of the second typeface character 86, its letter is printed one quarter of a letter spacing early along the line of printing compared with a letter symmetrical about the center line 92.

The third typeface character 88 has its type character displaced with respect to its center line 92 by a distance equal to one half of a letter spacing such that when the hammer 72 strikes the typeface portion 82 of the third typeface character 88, its letter (here exemplified by S) is printed half a character space along the line of printing earlier than if its type character were symmetrical about the center line 92.

The third typeface character 90 has its type character (here exemplified by the number 7) displaced from the center line 92 by three quarters of a character spacing such that when the hammer 72 strikes the typeface portion 82 of the fourth typeface character 90, the type character on the fourth typeface character 90 is printed on the line of printing three quarters of a letter spacing earlier than it would be printed if its type character were symmetrical about the center line 92.

In a last character 94 next adjacent to the first character 84 (and not shown in FIG. 8), the type character thereon is displaced away from the center line 92 by one complete letter spacing such that when the hammer 72 strikes the typeface portion 82 on the last character 94 its letter or number is printed one letter space earlier along the line of printing than it would be printed if its type character were symmetrical about the center line 92.

The various displacements shown for the type character in each of the first typeface character 84, the second typeface character 86, the third typeface character 88, the fourth typeface character 90 and the last typeface character 94 are exemplary stages of a sequence. Each of the typeface portions 82 of the daisy wheel 68 bears a character whose tangential displacement from its center line 92 is a proportional part of a letter spacing along the line of printing for the printed character to be early on the line of printing in proportion to the angular part of a full revolution that the particular typeface character 82 is around from the first typeface character 84 in a preferred direction. The transition from the last character 94 to the first typeface character 84 represents a "join" in the sequence where the displacement of the typeface on the typeface portion 82 abruptly moves from one full letter spacing back to zero.

In FIG. 7, a sixth arrow 96 indicates how the daisy wheel 68 rotates as the carriage 10 progresses along a line of printing.

In operation, when successive characters are printed, when a second character to be printed precedes the last print character 94 in the sequence of characters and is later in the direction of the sixth arrow than the previously printed character, the daisy wheel 68 executes one complete revolution and then goes on to rotate the desired character typeface portion 82 for striking by the hammer 72. If however the next character to be printed involves the rotation as indicated by the sixth arrow 96 of the daisy wheel "over the join" between the last character 94 and the first typeface character 84, then the daisy wheel 68 is simply rotated from its last printing position to its next printing position without execution of an additional full rotation. In this manner all characters printed along the line of printing are properly spaced and the hammer assembly 70 operates only once for each occasion that the "join" between the last typeface character 94 and the first typeface character 84 passes before the hammer 72.

In a controlled sequence to be described in detail later, the daisy wheel 68 is caused to execute a number of character typeface presenting steps. The first typeface character 84 is allocated a first binary number and the remaining typeface characters 86,82,88,90,94 are numbered in equi-spaced binary increment therefrom such that the last typeface character 94 has the highest number. When a currently printed character has a number less than that allocated to the next to be printed character, the maximum number of steps is added to the difference between the two numbers and the daisy wheel 68 caused to execute this increased number of steps before the print wheel is struck by the hammer 72. If however the number allocated to the next to be printed character is less than the number allocated to the last printed character, indicating that the "join" between the last typeface character 94 and the first typeface character 84 has to be crossed, the daisy wheel 68 is simply rotated as indicated by the sixth arrow 96 by a fraction of a revolution until the desired next to be printed character lies beneath the hammer 72.

Figure 9:
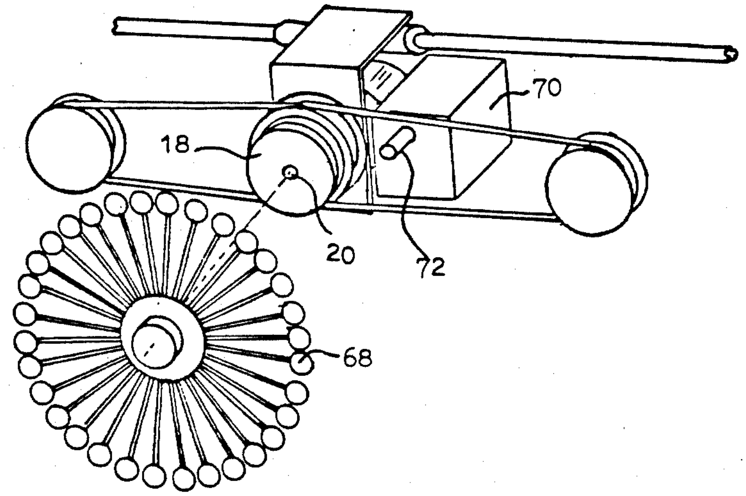
FIG. 9 illustrates how the hammer apparatus of FIG. 6 may otherwise be placed with the hammer spaced away from the axis of rotation of the daisy wheel along the line of printing.

FIG. 9 shows a second method of mounting the hammer assembly 70 in the embodiments described in this application, where the hammer 72 is mounted spaced from the axle 20 on the differential wheel 18 along a line parallel to the line of printing.

Figure 10:
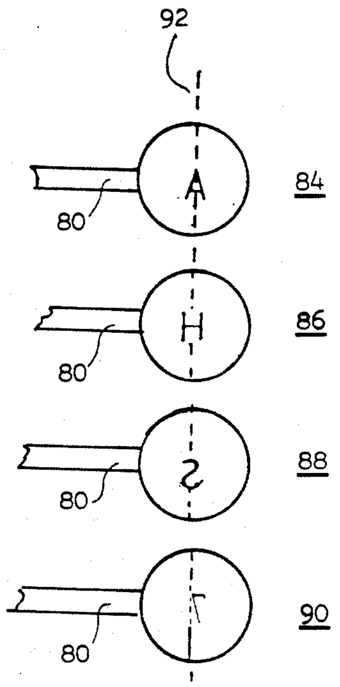
FIG. 10 shows the manner in which typeface characters are radially displaced on the daisy wheel when the hammer apparatus shown in FIG. 9 is employed.

FIG. 10 shows how the type characters on the daisy wheel 68 are radially displaced upon the typeface portions 82 of the daisy wheel 68 when used in an apparatus where the hammer 72 is positioned as shown in FIG. 9. As with FIG. 8, the first typeface character 84 has its type character symmetrical about the center line 92, the second typeface character 86 has its type character positioned relative to the center line 92 to be printed one quarter letter space early along the line of printing, the third typeface character 88 has its type character positioned relative to the center line 92 so as to have its character half a letter spacing early along the line of printing and the third typeface character 90 has its type character positioned to be printed along the line of printing three quarters of a letter space early, all with respect to that position whereat the respective characters would be printed if they were symmetrical with the center line. As before, the last typeface character 94 has its type character a full letter space early in its printing position.

The hammer assembly 70 can be positioned otherwise than as shown in FIGS. 6 and 8, in which case the displacement of the type characters with respect to a center radial line and a center tangential line will inversely reflect the combination of tangential and radial printing position components imparted by the position of the hammer 72.

Figure 11:
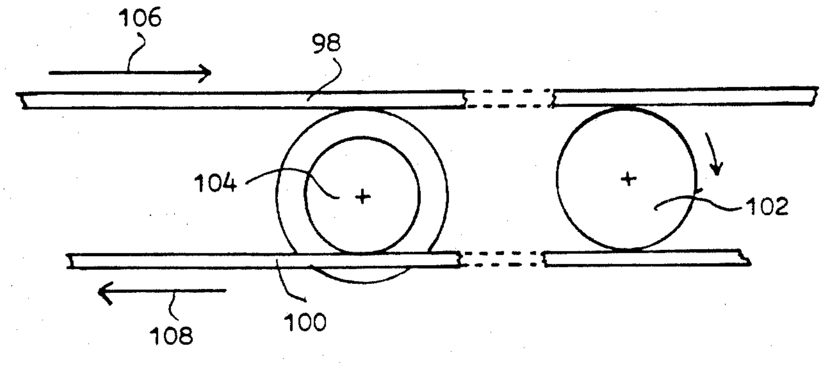
FIG. 11 shows a third preferred embodiment of the present invention wherein the endless belt of the first and second preferred embodiments are replaced by rigid racks.

FIG. 11 shows a third preferred embodiment of the present invention where the endless belt is replaced by a first rack 98 of solid construction and a second rack 100, also of solid construction, coupled together by a transfer roller 102. The first rack 98 bears upon a first portion of a first diameter of a modified differential wheel 104 and the second rack 100 bears upon a second portion of a second diameter of the modified differential wheel 104. The modified differential wheel 104 corresponds in essence to the differential wheel 18 of FIGS. 1, 2 and 4 and corresponds to the toothed or geared differential wheel 56 of FIG. 5. The racks may be toothed, in which case the modified differential wheel 104 is substantially identical with the differential gear wheel 56 of FIG. 5.

The transfer roller 102, which may also be toothed, ensures that as the first rack 98 is moved as indicated by a seventh arrow 106, so equal and opposite motion is transferred and imparted to the second rack 100 as indicated by an eighth arrow 108. As before, the daisy wheel 68 is affixed to rotate co-axially with the modified differential wheel 104.

Figure 12:
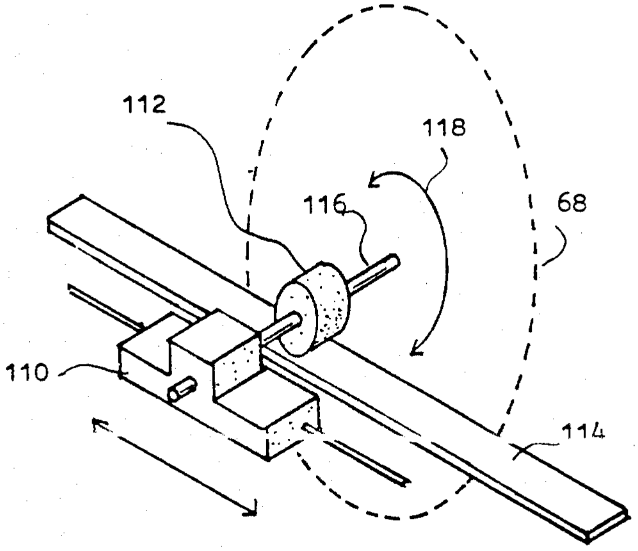
FIG. 12 shows the fourth preferred embodiment of the invention.

FIG. 12 shows a fourth preferred embodiment of the invention wherein a modified carriage 110 is driven along the line of printing by any one of several methods known in the art and where a roller 112 rolls along a flat platform 114 to rotate a shaft 116 which in turn imparts rotation as indicated by a seventh arrow 118 to the daisy wheel 68 shown in phantom outline. The roller 112 may be a gear wheel and the flat platform 114 can be a toothed rack. The diameter of the roller 112 can be chosen to impart the required rotation to the daisy wheel 68 by direct coupling to the shaft 116 whereon the roller 112 is mounted, or alternatively a gear box arrangement can be provided to transform the angular movement of the roller 112 into an angular rate of movement appropriate for the daisy wheel 68.

The modified carriage 110 can be moved along the line of printing by a rotating leadscrew, by rods, wires or endless loops in any manner known in the art. The daisy wheel 68 is not required to be mounted upon the same end of the shaft 116 as the roller 112 is situated and may be positioned otherwise than as is shown in FIG. 12 either directly or through a gear box to be rotated by the shaft 116 on the side of the modified carriage 110 closest to the point of view shown in FIG. 12

In the preceding figures, the daisy wheel 68 has been shown comprising thirty two fingers 80 which number has been chosen purely for convenience in illustrative presentation, and it is to be understood that the daisy wheel 68 can comprise as many fingers as is desired to provide the required number of typed characters.

In the foregoing and aftergoing descriptions, the daisy wheel 68 is described as comprising one complete set of characters presented beneath the hammer 72 for each complete rotation of the daisy wheel 68. This limitation to one character set per revolution of the daisy wheel is not a necessary part of the present invention. More than one character set with its increasing early printing off-set may be sequentially spaced around the wheel, in which case the "join" between the last typeface character 94 and the first typeface character 84 is the abutment between two sequential complete character sets. If two character sets are provided on each daisy wheel 68, then the carriage 10, 110 must execute a displacement along the line of printing of two letter spaces for each complete revolution of the daisy wheel 68. If three character sets are provided on the daisy wheel 68, the carriage 10,110 must execute movement of three letter spaces along the line of printing per revolution of the daisy wheel 68, and so on, the carriage 10,110 moving along the line of printing for each revolution of the daisy wheel 68 an equal number of letter spaces as there are complete sequential character sets upon the daisy wheel.

In the following description, it is assumed that there are exactly sixty-four characters in a set on the daisy wheel 68. This number is chosen purely for descriptive convenience and, since the average typewriter or printer has in excess of one hundred characters, it is to be understood that this number can be chosen to cover any size of character set.

Also in the following description a step is assumed to mean a rotation of the daisy wheel sufficient to bring the next typeface 82 around as indicated by the arrow 96 beneath the hammer 72.

It is preferred that the motor 30 is a stepping motor imparting one typeface displacement or step per step of the motor 30. However, those skilled in the art will be aware that the motor 30 may impart any integral number of steps between successive typeface characters 82 being presented to the hammer 72.

In the following description the daisy wheel 68 is described as being stopped in its rotation prior to operation of the hammer 72. Those skilled in the art will be aware how, in the present invention, the hammer 72 may be operated while the daisy wheel 68 is still in continuous motion to achieve the desired printing.

The motor 30 may equally well be a continuously operating motor and the angular position of the daisy wheel may be monitored by some form of shaft encoder indicating its position. Photo detectors may be used to detect particular typeface characters, such as the last typeface character 94 and/or the first typeface character 84.

Figure 13:
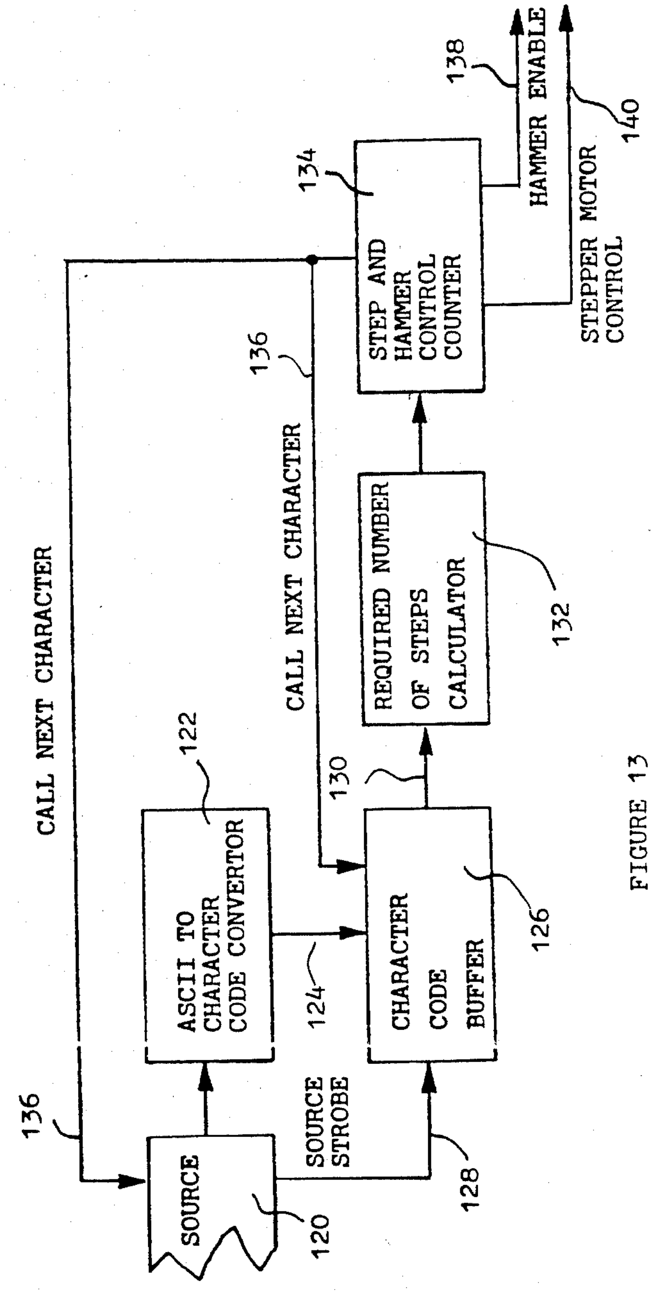
FIG. 13 shows a schematic block diagram of a controller used in any of the preferred embodiments of the invention.

FIG. 13 shows a schematic block diagram of a controller usable with any of the embodiments of the present invention.

A print command source 120 provides ASCII coded characters in parallel binary digit sequence on demand to an ASCII to character code converter 122 which recognizes the incoming ASCII code and changes the ASCII code into a numerically sequential code used to control the daisy wheel 68.

In the code converter 122, the different incoming ASCII codes are converted to a sequence of binary numbers where the first typeface character 84 receives the number 000000, the next around typeface character 82 as indicated by the arrow 96 receives the binary number 000001, the yet next around as indicated by the arrow 96 typeface character 82 receives the number 000010, and so on until the last typeface character 94 receives the binary number 111111.

The output 124 of the code converter 122 is presented at a first input to a character code buffer 126 and is received as an input whenever a source strobe 128 from the source 120 is operated. The code buffer 126 provides its output 130 as input to a required number of steps calculator 132 whenever a step and hammer control counter 134 activates a call next character line 136 to indicate that printing of the previously provided output character 130 from the buffer 126 has been executed. The call next character line 136 is also coupled back to the source 120 to indicate to the source 120 that the source must provide a further ASCII character as input to the code convertor 122.

The control counter 134 provides output 138 operative to cause the hammer assembly 70 to move the hammer 72 when required and further comprises a stepper motor control output 140 operative to administer positional steps to the motor 30.

Figure 14:
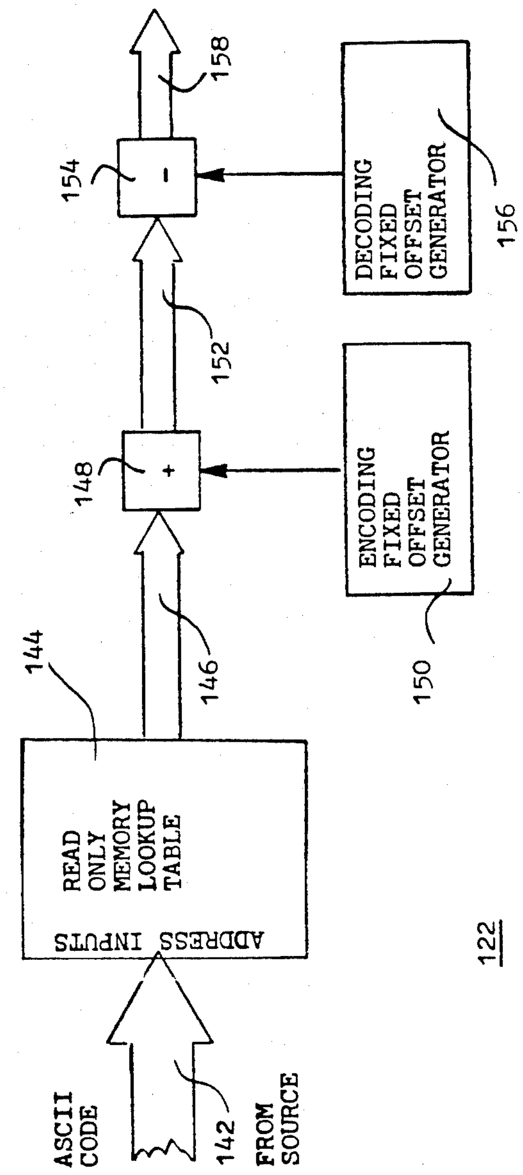
FIG. 14 shows a schematic block diagram of the ASCII to character code convertor of FIG. 13.

FIG. 14 shows a schematic block diagrm of the ASCII to character code converter 122 of FIG. 13.

The source 120 supplies ASCII code on a source bus 142 as an address input to a read only memory lookup table 144. As previously described, the data output 146 of the lookup table consists of a single binary number for each input address, the binary numbers having the positional sequence by unit increment indicated. Thus, as each ASCII code is received from the source bus 142 its angular position indicating binary step number is immediately provided as output 146 from the lookup table 144.

The lookup output 146 is coupled as input to a first adder 148 which is operative to add to the binary number retrieved a fixed off-set provided by an encoding fixed off-set generator 150. Thus, if its is required to provide a simply enciphered document where that letter a number of steps around from the desired letter equal to the output of the fixed off-set generator is to be printed, the fixed off-set generator 150 is activated to provide a non-zero output.

The output 152 of the first adder 148 is coupled as input to a first subtractor 154 operative to subtract a selectable decoding fixed off-set provided by a decoding fixed off-set generator 156 when it is desired to decode a simply enciphered document.

The source 120 of the ASCII code may be an electronic keyboard, a data communication circuit, a data processor or a disc or tape reading machine. Thus, a document can be provided with an off-set "built in" simply by selecting binary numbers to be provided by the generators 150,156 during printing of the document. If during printing a movement as indicated by the arrow 96 is required, then the encoding fixed off-set generator 150 is activated, and if a movement contrary to that indicated by the arrow 96 is required, then the decoding fixed off-set generator 156 is activated, it being understood that the terms encoding and decoding when used in this sense are interchangeable. When input from a tape disc data processor or document is provided as ASCII code, the output code 158 from the first subtractor 154 can be caused to be equivalent to the original unenciphered text by inversely setting one, the other or both of the two fixed off-set generators 150,156.

As far as controlling the daisy wheel 68 without an enciphering process, it is to be understood that the output 146 of the lookup table 144 may be taken directly as the output of the first subtractor 154.

Figure 15:
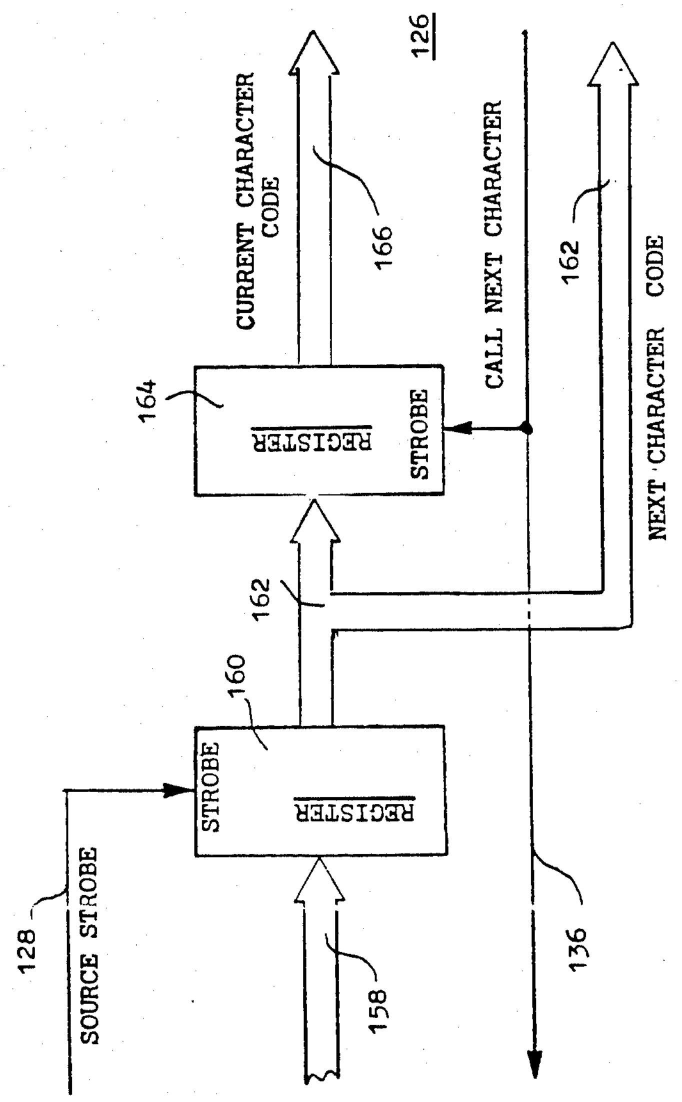
FIG. 15 shows a schematic block diagram of the character code buffer of FIG. 13.

FIG. 15 shows the character code buffer 126 of FIG. 13.

The output 158 of the first subtractor 154 (or alternatively the output 146 of the lookup table 144) is coupled as input to a latch register 160 strobed by the strobe source line 128 to receive and store the binary representation of the last ASCII code provided by the source 120.

The output 162 of the latch register 160 is provided as input to a second register strobed by the call next character line 136 from the step and hammer control counter 134 to hold and store the binary number currently presented at output 162 of the latch register 160 when the call next character line 136 is strobed. The output 166, indicating the current character code which the daisy wheel is to print, of the second register 164 is coupled as input to the step calculator as is the output 162 of the latch register 160 indicating the binary number code of the next character which is to be printed.

Figure 16:
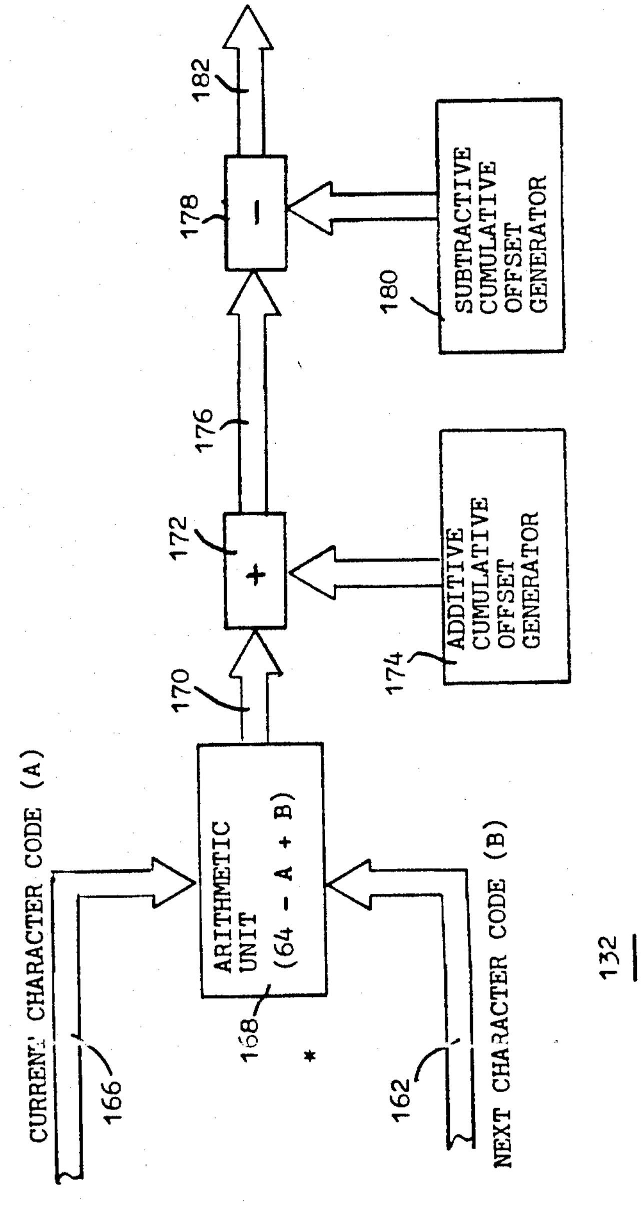
FIG. 16 shows a schematic block diagram of the required number of steps calculator of FIG. 13.

FIG. 16 shows the required number of steps calculator 132 otherwise shown in FIG. 13.

The output 166 of the second register 164 is coupled as a current character binary number or code indicating the character on the daisy wheel 68 which is to be printed as input to an arithmetic unit 168. The output 162 of the latch register 160 is coupled as a next character indicating code or binary number as a further input to the arithmetic unit 168. The arithmetic unit 168 calculates the required number of character printing positions the daisy wheel 68 is required uni-directionally to move in order to bring the next character indicated on the output 162 of the latch register 160 beneath the hammer 72.

As earlier described, the daisy wheel 68, if the next character has a binary number code greater than the current character binary number code, moves through an entire revolution before proceeding further around to the next character. If sixty four is here taken as the maximum number of characters on the daisy wheel 68 (only by way of example), then the daisy wheel 68 is first required to move through sixty four steps to bring it back with the current character beneath the hammer 72. If A is the binary number representative of the current character printed and B is representative of the binary number code of the next character to be printed, then, having executed sixty four steps, the daisy wheel 68 is obliged to execute a further $(B-A)$ steps. In total therefore, the wheel is required to execute $(64+B-A)$ steps.

As earlier described, if the current character code (A) is greater than the next character code (B) indicating that the daisy wheel must rotate through the "join" between the last typeface character 94 and the first typeface character 84, the complete revolution of the daisy wheel 68 is omitted and the daisy wheel rotates directly to the next character (represented by B) to be printed. In executing that movement, with sixty four the maximum number of characters on the daisy wheel 68, the daisy wheel 68 must first move $(64-A)$ steps to bring the last typeface character 94 beneath the hammer 72. Thereafter, the daisy wheel 68 must move a further B steps to bring the next character to be printed beneath the hammer 72. The total number of steps moved under these circumstances is thus $(64-A+B)$.

This last result is identical with the result when the daisy wheel 68 was not required to "cross the join" between the last typeface 94 and the first typeface character 84. Thus it is of no consequence whether the current address code or binary number (A) is greater than, equal to or less than the next character code (B) and the arithmetic unit 168 simply provides output 170 indicative of the number of positional steps to be imparted to the daisy wheel 68 equal to $(64-A+B)$.

The output 170 of the arithmetic unit 168 is coupled as input to a second adder 172 which also receives input from an additive cumulative off-set generator 174 comprising dials, switches or other input devices and operative to cause a selectable addition to the required number of steps. If no addition is required, the output of the additive cumulative off-set generator 174 is set to zero. The second adder 172 provides output 176 coupled as input to a second subtractor which in turn receives a further input from a subtractive cumulative off-set generator 180 which provides a number to be subtracted from the output 176 of the second adder 172. The second subtractor 178 provides output 182 coupled with input to the step and hammer control counter 134 of FIG. 13.

In a second method of enciphering and deciphering, briefly described here-above, a cumulative off-set is applied to the daisy wheel whereby the printed character moves around the daisy wheel by an acumulative amount which increases or decreases on each occasion of printing by selectable predetermined amounts chosen by operation of the additive cumulative off-set generator 174 and subtractive cumulative off-set generator 180. During enciphering a selected input is provided via the generators 174,180 to provide a document not readily readable. During deciphering the inverse off-set is applied via the generators 174,180 to provide legible output.

In a particularly advantageous form of enciphering, a combination of the fixed off-set generators 150,156 and the cumulative off-set generators 174,180 can be used to generate a document which is required to be deciphered by stages and at no point indicating a form whereat deciphering is complete save when the proper deciphering keys or inputs have been provided to all of the generators 150,156,174,180.

With regard to use of the present invention in enciphering and deciphering, the daisy wheel 68 is provided with a space character whereat the hammer 72 is operative.

In the prior art, it is usual when leaving a space between printed words merely to omit to operate the hammer or daisy wheel and to move the carriage along to the next subsequent printing position. By contrast, the daisy wheel 68 in the present invention employs an active space character on the daisy wheel 68 which, when struck by the hammer 72, leaves a negligible impression upon the paper but is nonetheless an active hammer operating position on the daisy wheel 68 like any other.

The active space character on the daisy wheel 68 ensures that during enciphering of any text the beginning and ends of words are concealed. The space character becomes substituted for a letter, and letters in turn become substituted for the space character. The test therefore is broken up into blocks not readily recognizable as individual words.

If it is not desired to provide any enciphering or deciphering facility in the printing apparatus, then the output 170 of the arithmetic unit 168 may be coupled directly in place of the output 182 of the second subtractor 178 and the cumulative generators 174,180 and the second adders and subtractors 172,178 omitted.

Figure 17:
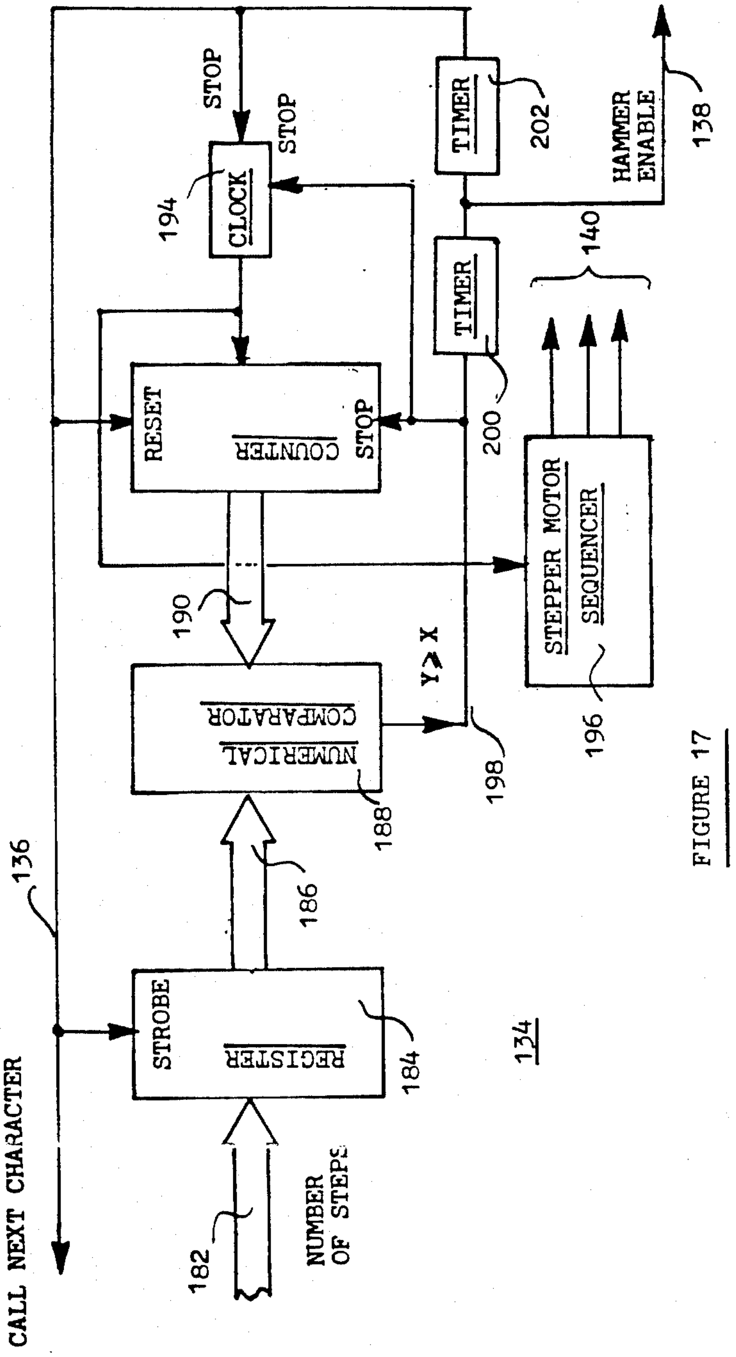
FIG. 17 shows a schematic block diagram of the step and hammer control counter of FIG. 13.

FIG. 17 shows the step and hammer control counter 134 of FIG. 13.

The output 182 of the second subtractor 178 is coupled as input to a step number storage register 184 which receives and stores its input whenever the call next character line 136 indicates that the character previously provided has been printed. The output 186 of the step number storage register 184 is coupled as a first input to a numerical comparator 188. Output 190 from a counter 192 is coupled as a second input to the numerical comparator 188. The output 190 of the counter 192 is indicative of the state of count of the counter 192. The counter 192 is reset to an all zeroes state whenever the call next character line 136 indicates that printing of the previously provided character has been completed.

A clock source 194 clocks both the counter 192 and a stepper motor sequencer 196. The sequencer 196 provides the stepper motor control output 140 (shown in FIG. 13) operative to provide drive to a plurality of windings in sequence in a manner well known in the art to cause the stepper motor 30 to step uni-directionally through a sequence of predetermined positions. Typically, the sequencer 196 will include a counter which will be initialized whenever optical or other detectors detect that the daisy wheel 68 is in a predetermined position and driver transistors driven via decoders from the counter operative to drive windings in the stepper motor 30. Each time the stepper motor 30 executes a step, the clock sources 194 causes the output 190 of the counter 192 to increment.

Whenever the call next character line 136 indicates that a new character is required to be printed, the step number storage register 184 receives the required number of steps from the output 182 of the second subtractor 178 and presents them as input 186 to the numerical comparator 188. The counter 192 is simultaneously reset to a zero count and the numerical comparator 188 compares the output 190 of the counter with the output 186 of the step number storage register 184. Each time the clock source 194 issues a pulse, the stepper motor 30 moves the daisy wheel 68 round by one position and the output 190 of the counter 192 increments. When the numerical comparator 188 provides output 198 indicative of the counter 192 output 190 having achieved the required number of steps, the counter 192 is stopped, the clock source 194 is stopped and a first timer 200 is activated.

First timer 200 allows the daisy wheel 68 properly to come to a halt while providing the hammer enable output 138 to the hammer assembly 70, causing the hammer 72 to fly towards the selected character typeface 82 on the daisy wheel 68.

Thereafter, a second timer 202 provides a second timing operation operative to allow the hammer 72 to strike the daisy wheel 68 and then retreat back into the hammer assembly 70. At the end of the operation of the second timer 202, a signal is provided (as previously described) on the call next character line 136 to present fresh characters throughout the apparatus (shown in FIG. 13) to be printed.

It is to be appreciated that the apparatus in FIG. 17 shows just one example of the manner in which the hammer 72 and the daisy wheel 68 may be operated. It is not strictly necessary that the motor 30 be a stepper motor. The motor 30 may be a D.C. motor continuously run and the position of the daisy wheel 68 can be monitored using photo cells and other sensors. The hammer 72 can be operated "on the fly" and the counter 192 can be incremented on each detection of a fresh character having passed before the hammer 72.

As previously stated, the present invention is not restricted to use of a daisy wheel 68 and any form of type bearing wheel or endless band can be used in place of the daisy wheel 68.

I claim:

1. A printing apparatus comprising:

a printhead assembly including a rotatable daisy print wheel, said daisy print wheel being mounted on said printhead assembly in fixed registration therewith; and means for simultaneously moving said printhead assembly along a line and rotating said daisy print wheel, said means including translation means for rotating said daisy print wheel through one complete character set provided on said daisy print wheel as said printhead assembly is moved along said line by one character printing space;

wherein type characters on the fingers of said daisy print wheel are progressively displaced relative to a center line associated with each finger, the displacement being proportional to the position of each type character between a first character and a last character in said complete character set;

said moving means including a single motor mounted on said printhead assembly and coupled both to simultaneously move said printhead assembly along said line and rotate said daisy print wheel;

a hammer mechanism mounted on said printhead assembly; control means for monitoring which character on said daisy print wheel is positioned in front of said hammer mechanism, said control means further for activating said hammer mechanism when a selected character is so presented;

command means for selecting a desired character, said control means including encryption means coupled to said command means and responsive to said command means for changing the selection of said desired character by providing a predetermined alternate selected character, said encryption means activating said hammer mechanism after said daisy print wheel has undergone a fixed displacement wherein it is rotated a predetermined number of character positions away from said selected character on said daisy print wheel to said predetermined alternate selected character.

2. The printing apparatus according to claim 1 wherein said daisy print wheel comprises:

a central hub; and a plurality of said fingers emanating from said hub at equally spaced intervals around the entire periphery of said hub, each of said fingers being straight, each of said fingers having one of said type characters at its extremity.

3. The printing apparatus according to claim 1 wherein said center line is in the same position for each of the daisy wheel fingers supporting one of the characters in said character set.

4. The printing apparatus according to claim 3 wherein:

said first character in said character set is symmetrical about its center line; and said last character in said character set is displaced away from its center line by one complete letter spacing.

5. The printing apparatus according to claim 1 wherein said encryption means includes means responsive to each operation of said hammer mechanism for automatically altering by a selectable integral number, the number of character positions by which said daisy print wheel is rotated between successive operations of said hammer mechanism for the number of character positions the printed character is away from the selected character on said print wheel to increase by said selected integral number on each occasion of printing of a character.

6. A printing apparatus comprising:

a print wheel bearing at least one character set;

means for moving said print wheel in a preferred direction along a line of printing;

means for rotating said print wheel through said one character set for each character space moved along said line of printing;

command means for providing a command signal, hammer means responsive to said command signal for striking said print wheel;

control means for monitoring the angular position of said print wheel and providing said command signal to said hammer means when a selected character is to be printed;

source means coupled to said control means for providing said control means with an input indication of a next selected character, said control means converting said input indication to a representative number, said control means generating a count of the number of character positions away from the last selected character, through which said print wheel must rotate to reach the position at which said next selected character is to be printed, said control means issuing said command signal to said hammer means when the last mentioned position has been reached;

said control means encrypting by adding a fixed offset number to the representative number of said next selected character and causing the printing of that character whose representative number is the sum of the representative number of said next selected character and said offset number;

said control means decrypting by subtracting the same fixed offset number used for encryption, from the representative number of the character which was actually printed and printing that character whose representative number is the difference of the representative number of the character printed and said offset number.

7. A printing apparatus as defined in claim 6 wherein each character set comprises a blank character which leaves a space when printed and which has its own representative number, whereby said blank character is printed during encryption in substitution for a printed character and for which, another printed character is substituted during encryption so that the beginnings and ends of encrypted words are concealed.

8. A printing apparatus as defined in claim 6 wherein said means to rotate said print wheel comprises a stepping motor operative to rotate said print wheel through one print character position in response to the occurrence of a predetermined number of steps, said control means providing a command to said stepping motor to cause the latter to rotate the print wheel through the required number of character positions.

9. A printing apparatus as defined in claim 8 wherein said stepping motor also comprises said means to move said print wheel in a preferred direction along a line of printing, said movement along said line of printing being in proportion to the rotation of said print wheel.

10. A printing apparatus comprising:

a print wheel bearing at least one character set;

means for moving said print wheel in a preferred direction along a line of printing;

means for rotating said print wheel through said one character set for each character space moved along said line of printing;

command means for providing a command signal, hammer means responsive to said command signal for striking said print wheel;

control means for monitoring the angular position of said print wheel and providing said command signal to said hammer means when a selected character is to be printed;

source means coupled to said control means for providing said control means with an input indication of a next selected character, said control means converting said input indication to a representative number, said control means generating a count of the number of character positions away from the last selected character, through which said print wheel must rotate to reach the position at which said next selected character is to be printed, said control means issuing said command signal to said hammer means when the last mentioned position has been reached;

said control means encrypting by adding cumulative offset numbers to the respective numbers of successive selected characters to be printed, each cumulative offset number automatically incrementing by a preselected amount for each character printed, said control means causing the printing of the character whose representative number is the sum of the representative number of the next selected character and its associated cumulative offset number; said control means further decrypting by subtracting said cumulative offset number as used for encryption from the representative number of the character actually printed and printing that character whose representative number is the difference between the representative number of the last mentioned printed character and its associated cumulative offset.

11. A printing apparatus as defined in claim 10 wherein each character set comprises a blank character which leaves a space when printed and which has its own representative number, whereby said blank character is printed during encryption in substitution for printed character and for which, another printed character is substituted during encryption so that the beginnings and ends of encrypted words are concealed.

12. A printing apparatus comprising:

a printhead assembly including a rotatable print wheel mounted on said printhead assembly in fixed registration therewith and hammer means for striking said print wheel; and moving means for moving said printhead assembly along a line whereon characters are to be printed at a plurality of spaced printing locations, said moving means further for rotating said print wheel to present to said hammer means in turn each of a complete ordered set of characters in sympathy with the moving of said printhead assembly along said line by a first distance equal to the spacing between said successive printing locations;

wherein said complete ordered set of characters comprises a first character undisplaced on said print wheel and wherein each other character in said complete set is displaced on said print wheel by a second distance proportional to the fraction of said ordered set between said each other character and said first character;

controller means for monitoring which character on said printwheel is presented ready for printing to said hammer means, said controller means further for activating said hammer means when a selected character is so presented;

command means for selecting a desired character, said controller means including activating means coupled to said command means and responsive to said command means for changing the selection of said desired character by providing a predetermined alternate selected character, said activating means activating said hammer means after said print wheel has undergone a fixed displacement wherein it is rotated a predetermined number of character positions away from said selected character on said print wheel to said predetermined alternate selected character.

13. An apparatus according to claim 12 wherein said controller means includes alter means responsive to each operation of said hammer means for automatically altering by a selectable integral number the number of character positions by which said print wheel is rotated between successive operations of said hammer means for the number of character positions the printed character is away from the selected character on said print wheel to increase by said selected integral number on each occasion of printing of a character.

14. An apparatus according to claim 13 wherein said print wheel includes an inter-word space character.

15. An apparatus according to claim 12 wherein said moving means includes a first portion of band; a second portion of band; and a differential wheel rotatably mounted on said printhead assembly and including a first portion of a first diameter engaging and rolling along said first portion of band and a second portion of a second diameter engaging and rolling along said second portion of band, wherein said first portion of band is movable in a first direction relative to said line, said second portion of band is simultaneously equally and oppositely movable with said first portion of band, and said differential wheel is bodily displaceable along said line a distance equal to the difference between the distance rolled along said first portion of band and the distance rolled along said second portion of band, the rotation of said differential wheel causing rotation of said print wheel, said first portion of said band being flexible and passing at least once around said portion of said differential wheel of said first diameter, said second portion of said band being flexible and passing at least once around said portion of said differential wheel of said second diameter.

16. An apparatus according to claim 15 wherein said print wheel is affixed to rotate with said differential wheel.

17. An apparatus according to claim 15 wherein said first portion of said differential wheel includes first gear teeth and wherein said first band portion is a toothed band portion and engages said first gear teeth on said first portion of said differential wheel.

18. An apparatus according to claim 17 wherein said second portion of said differential wheel includes second gear teeth and wherein said second band portion is a toothed band portion and engages said second gear teeth on said second portion of said differential wheel.

19. An apparatus according to claim 18 wherein said first and second band portions are portions of a common endless band.

20. An apparatus according to claim 19 wherein said common endless band is supported at extremities between a first idler pulley and a second idler pulley.

21. An apparatus according to claim 20 wherein said printhead assembly includes a motor coupled to rotate said differential wheel.

22. An apparatus according to claim 19 wherein said common endless band is supported at an extremity by a driven pulley and wherein said apparatus includes a motor coupled to impart rotation to said driven pulley.

23. An apparatus according to claim 15 further including disengage means for disengaging said first portion of said differential wheel from rolling against said first band portion.

* * * * *